United States Patent
Meschter

(12) 
(10) Patent No.: US 6,565,271 B1
(45) Date of Patent: May 20, 2003

(54) SELF-DEVELOPING FILM ASSEMBLAGES

(75) Inventor: John E. Meschter, Cambridge, MA (US)

(73) Assignee: Polaroid Corporation, Waltham, MA (US)

( * ) Notice: Subject to any disclaimer, the term of this patent is extended or adjusted under 35 U.S.C. 154(b) by 0 days.

(21) Appl. No.: 10/251,316

(22) Filed: Sep. 20, 2002

(51) Int. Cl.[7] .............................................. G03B 17/26
(52) U.S. Cl. ...................... 396/527; 430/207; 430/208; 430/210
(58) Field of Search ..................... 396/527; 430/210, 430/208, 207

(56) References Cited

U.S. PATENT DOCUMENTS

| | | | | |
|---|---|---|---|---|
| 2,612,450 A | * | 9/1952 | Land | 430/207 |
| 2,634,886 A | * | 4/1953 | Land | 222/107 |
| 2,983,606 A | * | 5/1961 | Rogers | 430/240 |
| 3,345,163 A | * | 10/1967 | Land et al. | 430/212 |
| 3,362,819 A | * | 1/1968 | Land | 430/213 |
| 3,415,644 A | * | 12/1968 | Land | 430/220 |
| 3,415,645 A | * | 12/1968 | Land | 430/220 |
| 3,473,925 A | * | 10/1969 | Milligan et al. | 430/208 |
| 3,594,164 A | * | 7/1971 | Rogers | 430/212 |
| 3,594,165 A | * | 7/1971 | Rogers | 430/212 |
| 3,695,884 A | * | 10/1972 | Land | 430/208 |
| 3,804,626 A | * | 4/1974 | Harvey | 430/210 |
| 3,833,382 A | * | 9/1974 | Land | 430/208 |
| 4,283,134 A | * | 8/1981 | Columbus | 396/527 |
| 4,693,963 A | * | 9/1987 | McCole | 430/499 |
| 4,735,886 A | * | 4/1988 | Oshikoshi et al. | 430/210 |
| 5,888,683 A | * | 3/1999 | Gula et al. | 430/22 |
| 5,888,693 A | * | 3/1999 | Meschter et al. | 430/208 |
| 6,221,554 B1 | | 4/2001 | Norris et al. | 430/207 |
| 6,291,128 B1 | | 9/2001 | Meschter et al. | 430/208 |
| 2002/0085182 A1 | | 7/2002 | Meschter et al. | 355/27 |

OTHER PUBLICATIONS

U.S. patent application Publication No. 2001/0053494 to Meschter et al., published Dec. 20, 2001.*

* cited by examiner

*Primary Examiner*—David M. Gray
*Assistant Examiner*—Michelle Nguyen

(57) ABSTRACT

Disclosed is a film assemblage of the self-developing type comprising a first and a second sheet in juxtaposed relationship to one another. Each of the sheets contains a plurality of exposure cut-outs at spaced apart intervals. Portions of the first and second rectangular sheets which separate individual exposure cut-outs contain a frangible line running in a direction perpendicular to the major axis of the rectangular sheet. The film assemblage further comprises a plurality of positive receiving sheets, a plurality of negative or photosensitive sheets, an elastic carrier sheet, a plurality of photographic processing fluid supply pods and a plurality of photographic processing fluid collection traps. The relationship between these elements in the film assemblage of the present invention is fully disclosed.

6 Claims, 6 Drawing Sheets

SELF-DEVELOPING FILM ASSEMBLAGES

BACKGROUND OF THE INVENTION

While photographic film assemblages of the self-developing type have undergone a plethora of advances, there remain several areas which require further examination and development. First, with the increasing growth of digital printing on a variety of low-cost media, conventional photographic film assemblages employing relatively more expensive silver halide emulsions face significant competitive challenges. As a consequence, there is an even keener interest to reduce overall film costs. Such interests are even more pronounced in the area of self-developing film assemblages since the latter include more complex chemistry, as well as the complexity of the film construction required for capturing and processing images in a self-contained manner. Further, it is highly desirable to allow the user to remove unneeded portions of the latter type of film unit so that only the image bearing portion remains, thereby giving the impression of a conventional 35 mm print or digital print.

Photographic film assemblages of the self-developing type are well-known in the photographic arts and have been described in numerous patents, such as, for example, U.S. Pat. Nos.: 2,612,450; 2,983,606; 3,345,163; 3,362,819; 3,415,644; 3,473,925; 3,594,164; 3,594,165; and, 5,888,693 issued to Polaroid Corporation, Cambridge, Mass., USA. In general, these film constructions employ sophisticated package constructions comprising several distinct components united together in a relatively complex approach in order to achieve a multiplicity of image capturing and processing functions. For instance, the film assemblage allows storing, spreading, collecting, and retaining of the processing fluid that initiates photographic development of latent images. In brief, each film unit generally includes a photosensitive sheet that captures latent images, a positive receiving sheet for producing the developed image, and a chemical reagent system including the processing fluid. The processing fluid is stored in a rupturable photographic processing fluid supply reservoir or "pod" for release and distribution between the photosensitive and positive sheets for initiating diffusion transfer, and a fluid trap is used to subsequently capture the processed fluid within the confines of the film unit. The film unit functions to safely store the sensitive chemical compositions during handling and processing, to insure that such chemicals effect the desired development without degradation, and to prevent leakage and/or contamination of the chemicals prior to use.

Photographic film assemblages of the self-developing type are generally categorized as so-called "peel-apart" versions, and "integral" versions. In the peel-apart version, provision is made for exposing a photosensitive sheet that is brought together, in overlying relationship, with an image receiving sheet carrying a rupturable reservoir or "pod" of processing fluid. The sheets pass through a pressure applying assembly comprising a pair of juxtaposed rollers that rupture the container and spread the fluid so as to initiate development of the latent exposed image. Excess fluid that passes between the sheets is then collected by a fluid trap. The user peels off the image bearing portion, while the pod and trap areas remain associated with the film assemblage.

Integral film units such as described in commonly assigned U.S. Pat. Nos. 3,415,645; 3,695,884; and 3,833,382, are considered self-contained in that the rupturable container or pod, imaging bearing area, and fluid trap remain together, or integral as a unit, both prior to and after exposing. Processing is carried out by passing the film unit through processing rollers that rupture the pod and distribute the processing fluid to initiate development. The trap subsequently captures excess processing fluid. Therefore, the film unit that emerges from a camera, for instance, is self-contained. U.S. Pat. No. 5,888,683 describes another example of a self-contained film assemblage in the form of an elongated strip that includes a plurality of film units or frames carried thereby; whereby each of the units is separable relative to the others.

For a variety of reasons, however, it is desirable to allow the user of integral film units to retain the image bearing portion free of the spent pod and associated trap. Efforts to achieve such pod and trap removal have been described. For example, commonly-assigned U.S. Pat. No. 2,634,886 discloses a peel-apart type of film assemblage which utilizes semi-perforations that allow manual severance of the positive print from adjacent areas of the film assemblage including the pod and trap. U.S. Pat. No. 3,804,626 discloses a film assemblage wherein the pod and trap are separated from the film unit; and wherein a processing fluid activated adhesive serves to seal the trailing end of the film unit. U.S. Pat. No. 4,693,963 uses perforations between the positive print and the pod and trap so as to allow for manual separation of the latter so that undesired elements of the film assemblage may be discarded. The aforementioned patent also teaches sealing along the open edges of the film resulting from detachment. Sealing may be accomplished by a pressure sensitive or processing fluid adhesive on one or more of the mutually facing surfaces of the open edges. Consequently, integrity of the developed film unit is maintained along with prevention of processing fluid leakage.

Thus, while efforts along the lines indicated above have been made, there is, nevertheless, a continuing need to improve upon the ease and reliability of removing from such self-developing film assemblages, the fluid pod, and fluid trap portions in a manner that substantially minimizes and/or seals against leakage of processing fluid, either prior to or after film processing.

Further, currently-available self-developing film assemblages lack the ability to be universally-utilized in a wide variety of differing camera types. Each self-developing film unit typically possesses a different construction in order to be used with a particular commercial line of self-developing cameras. It will be appreciated, therefore, that each camera line typically utilizes a different film construction.

Thus, despite the multiplicity of known self-developing film constructions and their commercial success, there is, nevertheless, a continuing desire to simplify these constructions and to reduce material and manufacturing costs, while concomitantly retaining their high degree of integrity and reliability. Accordingly, there remains a desire to develop a single, unified film architecture that is highly versatile from the standpoint of being capable of being used in a variety of existing and future self-developing camera lines of various film sizes. In addition, there also remains a desire to be able to remove unneeded film parts, such as pod and fluid collecting trap segments for purposes of presenting the resulting developed image area as a 35 mm-style print or as a digital print.

Also, as self-developing film assemblages are subjected to a relatively-high degree of stress as they are pulled through the camera's mechanism (e.g., rollers) during the development process, they must possess both mechanical and structural integrity. There continues to be a need for the development of such film assemblages.

SUMMARY OF THE INVENTION

The present invention relates to a film assemblage of the self-developing type comprising a first sheet and a second sheet in juxtaposed relationship to one another. Each of the sheets contains a plurality of exposure cut-outs at spaced-apart intervals. Portions of the first and second rectangular sheets which separate individual exposure cut-outs contain a frangible line running in a direction perpendicular to the major axis of the rectangular sheet. The film assemblage further comprises a plurality of positive receiving sheets, a plurality of negative or photosensitive sheets, an elastic carrier sheet, a plurality of photographic processing fluid supply pods and a plurality of photographic processing fluid collection traps. The relationship between these elements in the film assemblage of the present invention is fully described in the Description of Preferred Embodiments section which follows.

Briefly, the first and second rectangular sheets are aligned with exposure cut-outs and frangible lines in-register thereby forming a series of exposure frames separable along frangible lines. Each of the plurality of in-register exposure cut-outs, or exposure frames, has a leading edge and a trailing edge which are defined with respect to the order in which the edges pass a set of spread rollers in the camera in which the film unit is loaded. The leading edge of each exposure frame contains a channel in communication with a photographic processing fluid supply pod positioned between the first and second sheets, and the trailing edge of each exposure frame contains a channel in communication with a photographic processing fluid collection trap positioned between the first and second rectangular sheets. Each exposure frame is backed on one side by a positive receiving sheet, and on the other side by a negative or photosensitive sheet.

An elastic carrier sheet is adhered to each negative or photosensitive sheet, and to inter-exposure frame portions of the rectangular sheet to which the negative or photosensitive sheet is attached. Frangible lines fall between each point of adherence to a negative or photosensitive sheet, and adjacent points of adherence to inter-exposure frame portions of the rectangular sheets.

DESCRIPTION OF PREFERRED EMBODIMENTS

Figure 5:
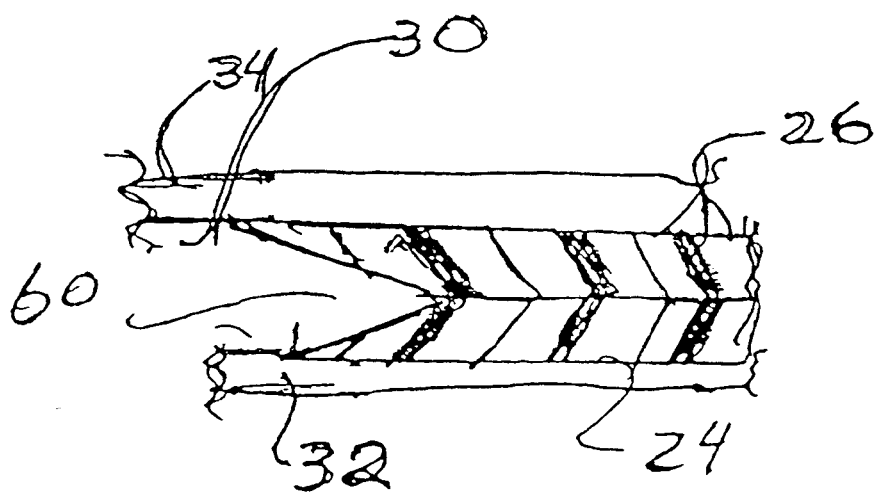
FIG. 5 illustrates a schematic and fragmented view of a portion of the film assemblage of the present invention (elastic carrier sheet omitted).
Figure 6:
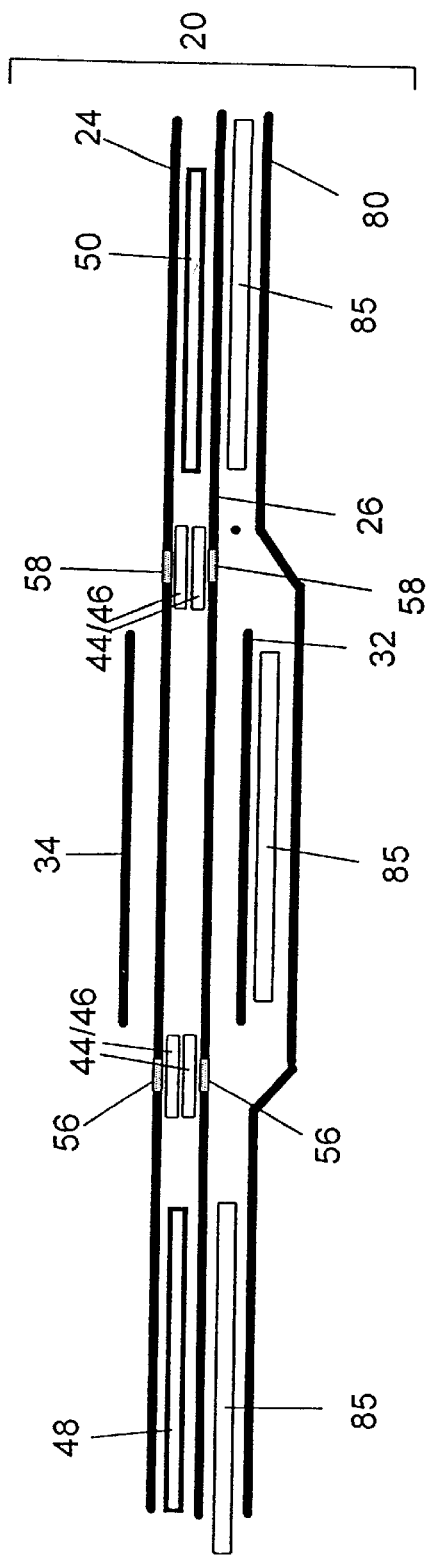
FIG. 6 illustrates a cross-sectional perspective view of the film assemblage illustrated in FIG. 1 and FIG. 2 further illustrating the carrier sheet and its attachment points to said film assemblage.

Reference is made to FIGS. 1–6 for purposes of illustrating a preferred embodiment of a self-developing film assemblage 20 (FIG. 6) of the present invention. More specifically, FIGS. 1–5 describe fundamental film architecture which may be the subject of previously filed patent applications. FIG. 6 illustrates an added element not shown in previous drawings or disclosed in the prior art. This novel element is carrier sheet 80.

While the attached drawings illustrate only a single film exposure frame or unit, it will be appreciated that the film assemblage of the present invention contemplates a series of interconnected, folded and stacked film units. It will be further understood that each of such units could have a construction similar to that described below, although the present invention is not to be limited to such.

In a preferred embodiment, the film assemblage 20 includes a pair of lower and upper (also referred to as a first and second) overlapping and generally elongated sheets 24 and 26, respectively, both sheets having a substantially rectangular configuration and size compatible with self-developing cameras. However, one skilled in the art will recognize that a variety of sheet configurations and sizes are envisioned. The first and second sheets 24, 26 are preferably fabricated from a flexible, relatively inelastic polymeric material (e.g., polyester) which possesses a high tensile strength. While polyester is preferred, other polymers having similar flexibility, tensile strength, and relative degree of inelasticity are also contemplated for use with the film assemblages of the present invention. The first and second sheets 24, 26 should also accept a wide variety of adhesives and/or be capable of heat, pressure, or ultrasonic bonding to one another, or other components of the film assemblage. In addition, other materials besides plastics are contemplated including those known in the photographic arts.

A pair of rectangular cut-outs 28, 30 are provided in the first and second sheets 24, 26, respectively (again, only single frames are shown in the drawings). A generally rectangular negative photosensitive sheet 32 is attached at marginal edges of its perimeter to an outer surface of sheet 24 by means of a suitable adhesive (not shown) known within the art, so as to cover the rectangular cut-out 28. A positive receiving sheet 34 is attached at marginal edges of its perimeter to the outer surface of the other sheet 26 by means of a suitable adhesive (not shown) so as to cover the rectangular cut-out 30. It should be noted that other methods of securing the negative photosensitive sheet 32 and positive receiving sheet 34 to cover the rectangular openings are contemplated, such as ultrasonic welding. The opposed surface 36 and mating surface 38 of the first and second sheets are also joined together, in a manner to be described, infra. The joining of these sheets is significant, due to the fact that the joined sheets are effective for establishing a predetermined mechanical gap 40 (see FIG. 3) between the negative or photosensitive sheet 32 and positive sheet 34. The mechanical gap 40 is important for successfully controlling the spreading and distribution of the processing fluid and hence controls the diffusion transfer process.

One significant advantage of the present invention is that it establishes the mechanical gap 40 without utilizing rails. Heretofore, rails have been used for setting this gap. Accordingly, the present invention leads to a significantly simplified and less costly construction and one which minimizes the processing steps. Moreover, rails add to manufacturing complexity and costs. Hence, the present invention significantly reduces such costs and complexity. In the context of this embodiment, the gap 40 is established by the combined thickness of each of the first and second sheets 24, 26. Accordingly, it will be noted that the thickness of each sheet is selected, so that their combined thickness in juxtaposed relationship is sufficient to provide the desired mechanical gap 40. Therefore, it will be readily appreciated that one sheet can have a thickness different from the other, so long as the combined thickness provides the desired mechanical gap 40. It will be further appreciated, of course, that the gap can have a variety of dimensions, per se, not forming an aspect of the present invention.

By eliminating the rails, significant savings are realized in terms of reduced costs of the film, a reduction in the manufacturing costs, as well as improved manufacturing throughput. Accordingly, the construction of this embodiment allows the formation of a variety of self-developing films without the need for rails. The first and second sheets 24 and 26 can have combined thickness in the order of approximately 0.0015 inches to approximately 0.020 inches, although one skilled in the art will appreciate that other thickness are clearly contemplated.

In addition to the above advantages, the construction of this embodiment is highly reliable in operation and does not require an external mask.

Formed adjacent the leading and trailing ends of the rectangular cut-outs 28, 30 is zone 44 comprising a liquid activated adhesive 46, such as an alkali-activated adhesive e.g., Gantrez™). The adhesive 46 is activated by the processing fluid (not shown) for joining the mutual facing zones 44 when the latter are subject to the compressive forces typically experienced when the film unit is processed by the processing rollers (not shown). Prior to activation of the adhesive 46, the non-adhesively-joined zones 44 form passages between the sheets allowing the processing fluid from a ruptured photographic processing fluid supply reservoir or pod 48 to flow into the gap 40 and eventually enter a fluid collecting trap 50. Both the pod 48 and fluid collecting trap 50 have constructions and functions that are well-known. Each of the pod and fluid collecting trap is joined to either one of the first or second sheets as illustrated between the first and second sheets 24, 26 in areas adjacent the zones 44 prior to the sheets being joined. The first and second sheets 24, 26 define a pair of flaps 52 which are sized and shaped so that when joined, they are adapted to form an enclosure for the pod 48. Another pair of flaps 54 is formed by the lower and upper sheets 24, 26 and is sized and shaped so that when joined they are adapted to form an enclosure for the fluid collecting trap 50 along with a passage for the flow of the processing fluid.

In addition, a white bordered area or mask can also be created around the image area and is internal to the positive sheet by virtue of a white sheet material being provided, thereby eliminating the need for an external masking element. In this regard, the white border is comprised of the upper sheet material being a white material, preferably polyester.

Figure 1:
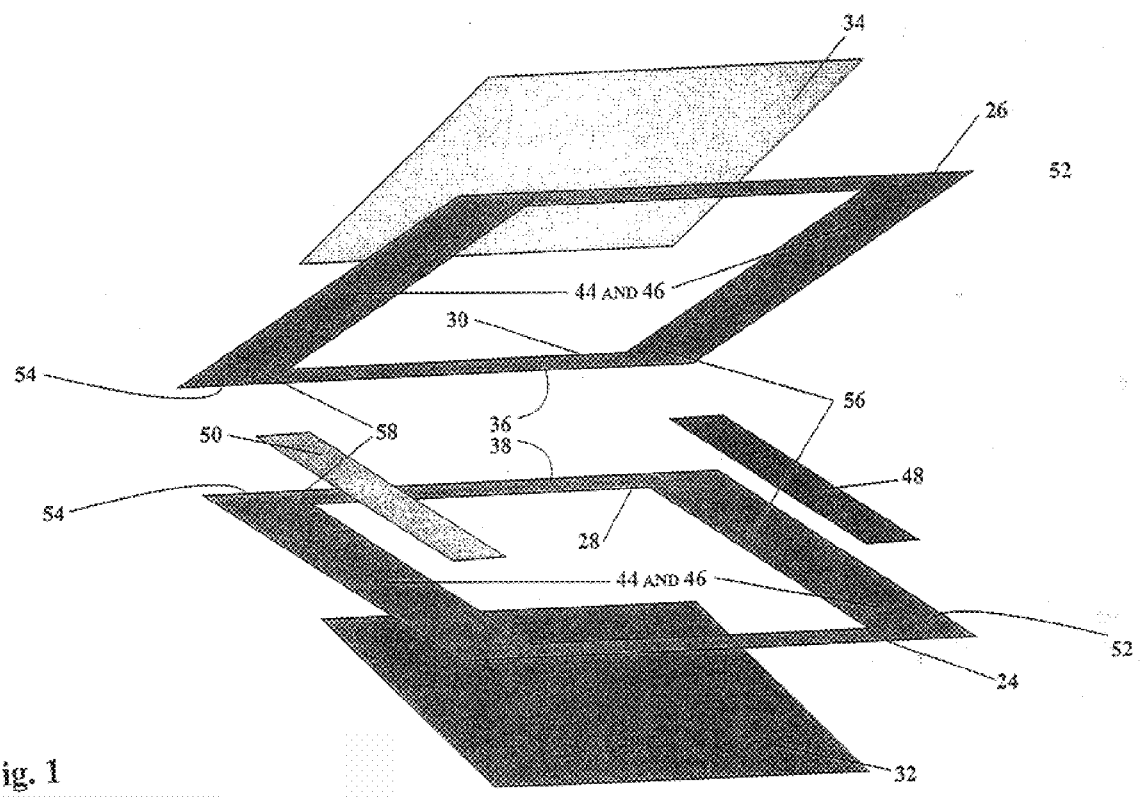
FIG. 1 illustrates an exploded perspective view of an exposure frame portion of a preferred embodiment of a film assemblage of the present invention with the elastic carrier sheet omitted.
Figure 2:
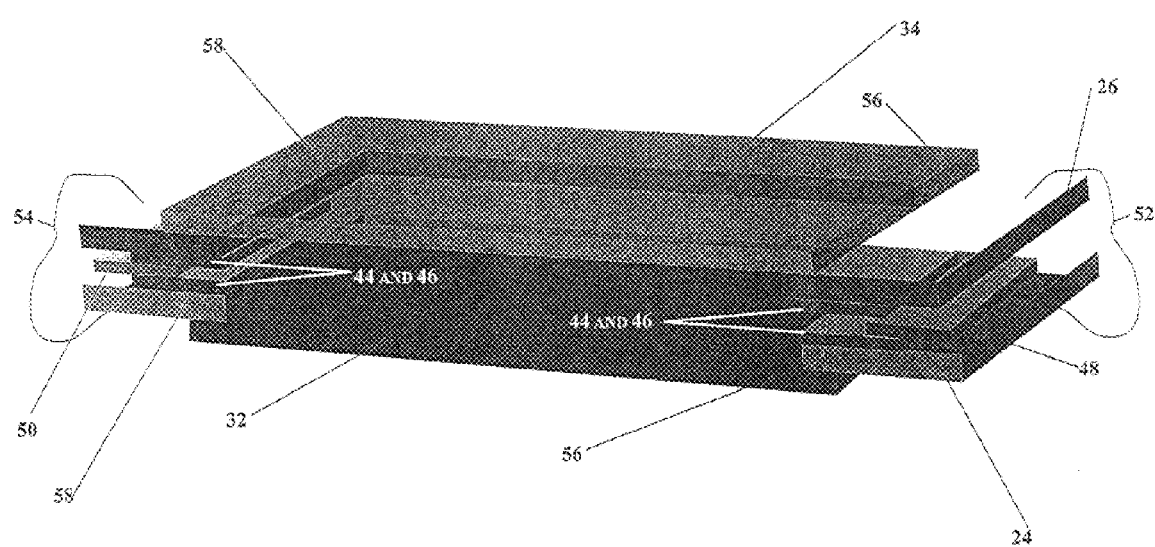
FIG. 2 illustrates a cross-sectional perspective view of the film assemblage illustrated in FIG. 1.
Figure 3:
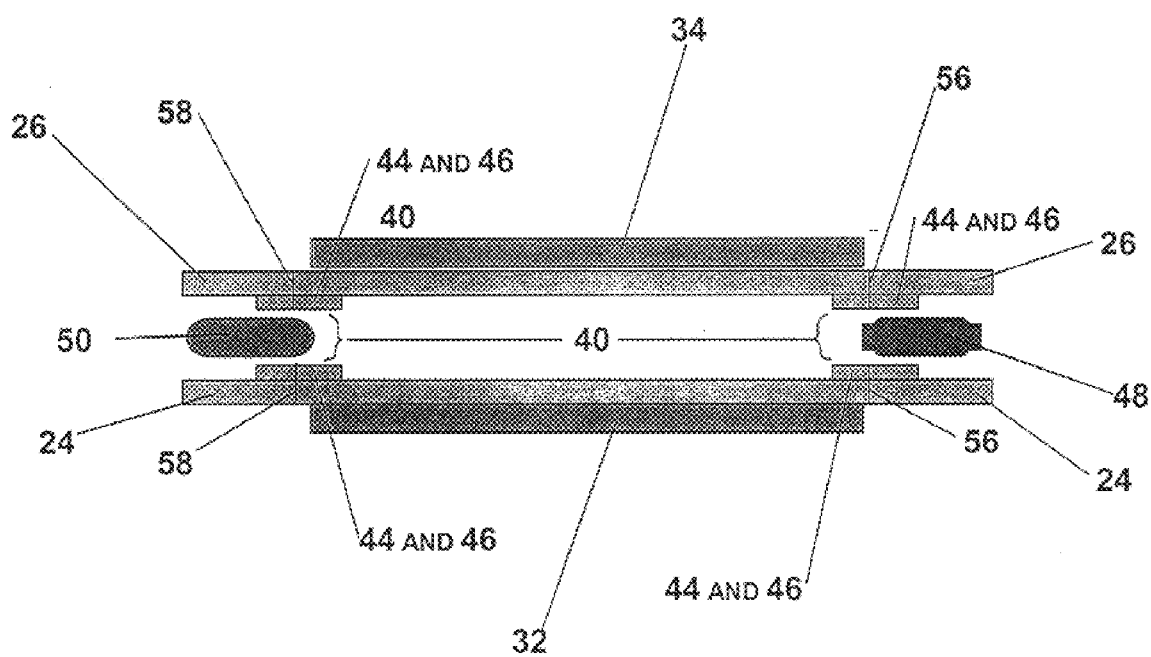
FIG. 3 illustrates a longitudinal cross-sectional elevation view of the film assemblage of the present invention with the elastic carrier sheet omitted.
Figure 4:
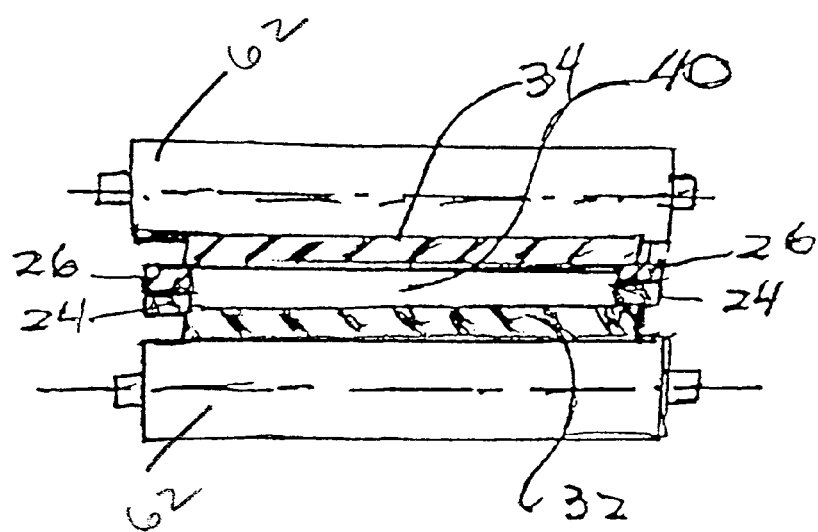
FIG. 4 illustrates a schematic cross-sectional view across the width of the film assemblage of the present invention with the elastic carrier sheet omitted.

It will be appreciated that the first and second sheets 24, 26 are to be joined in a superimposed relationship as illustrated in FIG. 2, whereby the mutually facing surfaces are joined together under the application of heat and pressure and the openings are in registration with each. As a result, the negative or photosensitive and positive sheets 32, 34 are joined together in superimposed relationship with their inner surfaces having the gap 40 defined by the combined thickness of the sheets. Accordingly, the foregoing construction minimizes interruptions in the flow of processing fluid and thus minimizes perturbations to the flow as compared to other systems known within the art. Moreover, the simplified construction (see, FIG. 4) at the point of contact with the spread rollers 62 makes the processing fluid pathway (i.e., mechanical gap 40) completely rigid and unobstructed, thereby making the processing fluid flow repeatable without regard to geometry. Thus it can be used in different sizes and can thus be used in different imaging systems as well as by retrofit to existing systems.

Reference is made to FIG. 5 for illustrating the preferred embodiment. The size of the lower opening for the negative or photosensitive sheet 32 is preferably larger than the opening in the upper sheet 26 for the positive sheet 34. The upper and lower sheets 24, 26 are not joined completely along the mutually facing surfaces. As viewed in cross section of the preferred embodiment, the mutually facing surfaces are joined only a portion of the distance from along their longitudinal edges to the edges of the respective openings. By virtue of the latter, there is a lateral space 60 adjacent each edge of the registered openings. The lateral spaces 60 accommodate the lateral edges of the spreading processing fluid and internally mask the edge defects and fringe effects. The different sized openings facilitate the masking effect since the upper sheet extends so as to even more cover any edge defects that might occur.

Because of the edge joined upper and lower construction of this film assemblage, all mutually facing areas there are joined, prior to processing, but for the gap 40 in the image area, and the spacings between the unadhered zones 40 which form spacings for the passages for the processing fluid to flow from the pod to the image area and from the image area to the fluid collecting trap. Once zero gap areas in the zones 44 have been sealed as explained below, the user can tear or sever portions defining the zero gap without leaking of the processing fluid. For sealing the zones 44, the fluid activated adhesive 46 is pressed together by passage thereof through the spread rollers in order to create sealed zero gap areas. The frangible lines formed in the upper and lower sheets roughly bisect their sealing zones transverse the direction of passage through the spread rollers.

As best illustrated in FIG. 6, a carrier sheet 80 is attached using a suitable adhesive 85 to the lower surfaces of both the negative or photosensitive sheet 32 and the sheet to which the negative or photosensitive sheet is attached 26. The carrier sheet 80 is comprised of a material possessing a relatively-high degree of elasticity, which is a function of the thickness and/or modulus of elasticity of the material. The carrier sheet imparts a high degree of mechanical strength and structural stability to the film assemblage and functions to prevent both breakage of the linear film assemblage and premature separation of the various film components, especially when the assemblage is being pulled askew to a linear path.

In preferred embodiments, the carrier sheet is oriented polypropylene. Thicknesses ranging from 0.0005 inches up to 0.002 inches were found to be satisfactory, with a thickness of 0.0015 inches being preferred. The elastic modulus of the carrier sheet was selected such that, for the thickness employed, and the length of carrier material not bonded to the film frame and associated elements of the assemblage, the force applied to pull the film and its pod and trap from the camera was sufficient to elongate the elastic carrier enough to apply sufficient force across the frangible lines to cause them to rupture. It was permissible for the elastic carrier to actually deform plastically so long as its strength (i.e., force required to break it) was high enough to prevent rupture of the elastic carrier. In fact, some plastic deformation of the carrier was desirable because it contrasted the ruptured frangible lines and made it clear where to peel the image from the elastic carrier backing.

Frangible lines 56 and 58 are formed between exposure frames in the first and second rectangular sheets anywhere between the pod or trap and the image area. In use, the frangible lines 56 and 58 provided in the first and second rectangular sheets 24 and 26, break as the film is advanced through a spread roller in the camera. As the frangible line at the leading edge of an exposure frame 56 breaks and the film passes the spread roller, the elastic carrier sheet 80 stretches between two direct or indirect attachments points on one of the rectangular sheets. The first attachment point, which is indirect, is an adhesive-mediated contact to a negative or photosensitive sheet 32. Adhesive layer 85 is shown in FIG. 6 between the elastic carrier sheet 80 and the photosensitive sheet 32. A second adhesive layer 85 is shown in FIG. 6. The second adhesive layer joins the elastic carrier sheet 80 directly to an inter-exposure frame portion of rectangular sheet 26. Thus, as frangible line 56 passes through the camera spread roller it is exposed to the tension applied to pull the film out of the camera and it breaks thereby forming a separation or fracture in the in-register first and second rectangular sheets 24 and 26. When the fracture forms at frangible line 56; the elastic carrier sheet 80 is free to stretch between the flanking adhesive attachment points 85.

As the advance of the film continues, frangible line 58 passes through the spread roller and forms a second fracture in the in-register first and second sheets. Elastic carrier sheet 80 again stretches between points of direct or indirect adhesive contact with rectangular sheet 26. In this case, the relevant points of adhesive contact are an indirect contact via the photosensitive sheet 32, and a direct contact with rectangular sheet 26 at a second inter-exposure frame portion 85 represented near trap 50 in FIG. 6.

The stretching of the elastic carrier sheet 80 facilitates the removal of a 4-part exposure frame comprising in-register cut-out portions of the first and second rectangular sheets 24 and 26, as well as an exposed positive receiving sheet 34 and an exposed negative or photosensitive sheet 32. The 4-part exposure frame is easily peeled from the carrier sheet leaving behind the unwanted components of the film assemblage, namely, the elastic carrier, spent pod and trap, and the associated upper and lower sheets outside of the image area. It is important to note that because the frangible lines bisect the liquid activated adhesive, the upper and lower layers containing the spent pod and trap are sealed shut just as the edges of the removed 4-part exposure frame are sealed shut thereby preventing leakage from image or debris. Following the removal of the 4-part exposure frame, unwanted elements of the film assemblage remain attached to the elastic carrier sheet 80 for convenient disposal.

Although the invention has been described in detail with respect to various preferred embodiments, it is not intended to be limited thereto, but rather those skilled in the art will recognize that variations and modifications are possible which are within the spirit of the invention and the scope of the appended claims.

What is claimed is:

1. A self-developing film unit comprising:
    a) a first rectangular sheet having a plurality of exposure cut-outs at spaced-apart intervals, portions of the first rectangular sheet which separate individual exposure cutouts containing a frangible line running in a direction substantially perpendicular to the major axis of the first rectangular sheet;
    b) a second rectangular sheet having a plurality of exposure cut-outs at spaced-apart intervals, portions of the second rectangular sheet which separate individual exposure cutouts containing a frangible line running in a direction substantially perpendicular to the major axis of the second rectangular sheet;
    c) a plurality of positive receiving sheets;
    d) a plurality of negative or photosensitive sheets;
    e) an elastic carrier sheet;
    f) a plurality of photographic processing fluid supply pods; and
    g) a plurality of photographic processing fluid collection traps;

the components being assembled such that the first and second rectangular sheets are aligned with exposure cut-outs and frangible lines in-register thereby forming a series of exposure frames separable along frangible lines, each of the plurality of in register exposure cut-outs, or exposure frames, having a leading edge and a trailing edge defined with respect to the order in which the edges pass a set of spread rollers in a camera in which the film unit is loaded, the leading edge of each exposure frame containing a channel in communication with a photographic processing fluid supply pod positioned between the first and second rectangular sheets, and the trailing edge of each exposure frame containing a channel in communication with a photographic processing fluid collection trap positioned between the first and second rectangular sheets, each exposure frame being backed on one side by a positive receiving sheet, and on the other side by a negative or photosensitive sheet, the elastic carrier sheet being adhered to each negative or photosensitive sheet, and to inter-exposure frame portions of the rectangular sheet to which the negative or photosensitive sheet is attached, frangible lines falling between each point of adherence to a negative or photosensitive sheet, and adjacent points of adherence to inter-exposure frame portions of the rectangular sheets.

2. The self-developing film unit of claim 1 wherein, in use, the two frangible lines associated with a single exposure frame are broken as the frame passes through camera spread rolls, thereby enabling the removal from the camera of an exposed unit comprising:
    a) an exposure frame portion of the first rectangular sheet,
    b) an exposure frame portion of the second rectangular sheet,
    c) a negative or photosensitive sheet,
    d) and a positive receiving sheet, the elastic carrier sheet maintaining direct or indirect contact with all other elements of the film.

3. The self-developing film unit of claim 2 wherein the elastic carrier sheet and associated waste material is retained as a roll within the camera following removal of an exposed unit.

4. The self-developing film unit of claim 1 wherein the elastic carrier sheet is oriented polypropylene.

5. The self-developing film unit of claim 4 wherein the thickness of the oriented polypropylene is within the range of about 0.0005 inches to about 0.002 inches.

6. The self-developing film unit of claim 1 wherein the film unit is folded into a film package such that individual exposure frames are oriented in fully juxtaposed relation with immediately adjacent individual exposure frames.

* * * * *